Patented Nov. 10, 1942

2,301,429

UNITED STATES PATENT OFFICE 2,301,429

METHOD OF AND COMPOSITION FOR TREATING WATER

Rowland R. Magill, Lakewood, Ohio, assignor to Coal Processing Corporation, Chicago, Ill., a corporation of Illinois No Drawing. Application April 22, 1940, Serial No. 330,895

8 Claims. (Cl. 210—23)

The present invention relates to a new and improved method of and composition for treating water, and has particular reference to the clarification of water, as, for example, in the supply systems for cities and other municipalities.

The common method employed in the clarification of water involves the addition of a substance known commercially as alum and sometimes also the addition of lime. These two substances constitute a coagulant which results in the formation of a floc, and this floc gathers unto itself undesirable suspended matter and precipitates therewith to effect a clarification of the water.

The use of alum as a coagulant is subject to certain disadvantages and its satisfactory use is dependent on careful regulation of the hydrogen ion concentration of the water. Unless this concentration is properly regulated, the floc formation may be insufficient to completely remove the suspended matter or may be so finely divided that it will not precipitate within a reasonable time. It is also likely to result in a sulphate hardness and to increase the hardness of the water in general.

The primary object of the present invention is to provide a novel composition of matter for use as a water clarifying coagulant which is highly efficient, quick acting and economical. In general, the invention contemplates the use of a coagulant consisting of finely divided bituminous coal, tetra sodium pyrophosphate, and ferric sulphate. If desired, lime may be used with the aforesaid composition to accelerate the action of the coagulant.

The finely divided coal, the tetra sodium pyrophosphate and the ferric sulphate are uniformly mixed in suitable proportions to form the coagulating composition and it is this composition which is added in proper amounts to the water. The proportions of these ingredients may be varied within certain limits and the preferred proportions by weight are as follows:

Finely divided coal_____ 70 per cent.
Tetra sodium
 pyrophosphate_____ From 20 to 25 per cent.
Feric sulphate_____ From 10 to 5 per cent.

It will be noted that the ratio of tetra sodium pyrophosphate to ferric sulphate for a given proportion of coal varies between 2 and 5. The proportion of coal in the composition may be varied from 50 to 80 per cent., and in such variation the proportions of the other two ingredients are varied inversely but within the aforesaid range of ratios.

The coal may be comminuted to various degrees of fineness, and preferably is provided in as finely a divided state as is practicable without tending to cause the coal particles to come into colloidal suspension. This finely divided state of the coal facilitates the chemical reactions with the other ingredients and further increases the efficiency and speed of flocculation. The coal particles serve to absorb odors and become impregnated to some extent with the other chemicals. Due to their specific gravity, the residual particles of the coal tend to float and to become finely dispersed over the surface of the water. These particles form the nucleus of the floc, and the floc as it increases in size, with an attendant change in specific gravity, is caused to be dispersed throughout the body of the water as a result of gentle agitation.

The presence of the tetra sodium pyrophosphate in the composition imparts to the composition when added to the water the property of accelerating the growth and increasing the size of the floc. The composition also has the property of reducing the residual hardness of the water.

The presence of the ferric sulphate in the composition imparts to the composition when added to the water the primary function of forming the floc. The amount of floc that will be formed by the presence of a given amount of ferric sulphate is much greater than it would be if the composition did not include the finely divided coal and the tetra sodium pyrophosphate.

In carrying out the method, the foregoing composition and preferably lime are added in amounts required by the analysis of the water and the water then is maintained in a mild state of agitation to facilitate the formation of the floc and the attendant entanglement therewith of the suspended matter, certain bacteria and various other impurities in the water. Then the water is directed into a settling basin where it is free of agitation to permit the floc to precipitate or settle rapidly to the bottom.

It will be seen that I have provided a novel and advantageous method of and composition for treating water. A comparatively small amount of the composition is required to effect satisfactory clarification. The amount required is much less, for example, only one-fourth or less, than the amount of alum that would be required to effect equivalent results. The formation of the floc also is rapid and efficient and as a result of the foregoing the present method is more economical than other methods in common use. Apart from its function in clarifying the water, the composition also has the property of absorbing objectionable gases and odors such, for example, as carbon dioxide, hydrogen sulphide and phenol odors, and the further property of reducing the residual hardness of the water to a marked extent.

I claim as my invention:

1. A composition for treating water to remove suspended matter therefrom consisting of finely divided bituminous coal, tetra sodium pyrophosphate and ferric sulphate in such relative proportions as to effect flocculation and precipitation of the suspended matter.

2. A composition for treating water comprising the following ingredients in the following proportions by weight:

| | Per cent approximately |
|---|---|
| Comminuted coal | 70 |
| Tetra sodium pyrophosphate | 20 to 25 |
| Ferric sulphate | 10 to 5 |

3. A composition for treating water comprising the following ingredients in the following proportions by weight:

| | Per cent |
|---|---|
| Comminuted coal | 50 to 80 |
| Tetra sodium pyrophosphate and ferric sulphate | 20 to 50 | with the ratio of tetra sodium pyrophosphate to ferric sulphate coming within a range of from 2 to 5.

4. The method of clarifying water which comprises treating the water by the addition of a composition in an amount sufficient to remove by flocculation and precipitation suspended matter in the water, and consisting of comminuted bituminous coal, tetra sodium pyrophosphate, and ferric sulphate in such relative amounts as to effect flocculation and precipitation.

5. The method of clarifying water which comprises treating the water by the addition of a composition in an amount sufficient to remove by flocculation and precipitation suspended matter in the water, and consisting of comminuted bituminous coal, tetra sodium pyrophosphate, and ferric sulphate, in such relative amounts as to effect flocculation and precipitation then maintaining the water in a mild state of agitation during the formation of the floc, and then maintaining the water in a quiescent state to permit the floc to settle out.

6. The method of clarifying water which comprises treating the water by the addition of a composition consisting of approximately 70 per cent. of comminuted bituminous coal, from 20 to 25 per cent. of tetra sodium pyrophosphate, and from 10 to 5 per cent. of ferric sulphate, in an amount sufficient to effect coagulation of suspended matter in the water into a floc, maintaining the water in a mild state of agitation during the formation and growth of the floc, and then maintaining the water quiescent to facilitate settling out of the floc.

7. A composition for treating water comprising lime and comprising the following additional ingredients in the following proportions by weight:

| | Per cent |
|---|---|
| Comminuted coal | 50 to 80 |
| Tetra sodium pyrophosphate and ferric sulphate | 20 to 50 | with the ratio of tetra sodium pyrophosphate to ferric sulphate coming within a range of from 2 to 5.

8. A composition for treating water to remove suspended matter therefrom consisting of ferric sulphate in an amount sufficient when in the presence of the other ingredients to effect coagulation of suspended matter in the water into a floc, finely divided coal in an amount sufficient to form the nucleus of said floc, and tetra sodium pyrophosphate in an amount sufficient to accelerate the growth and increase the size of said floc.

ROWLAND R. MAGILL.

CERTIFICATE OF CORRECTION.

Patent No. 2,301,429.  November 10, 1942.

ROWLAND R. MAGILL.

It is hereby certified that error appears in the printed specification of the above numbered patent requiring correction as follows: Page 1, first column, line 49, for "Feric" read --Ferric--; page 2, first column, line 20, claim 2, strike out "approximately" and insert the same before "70" in line 21, same claim; and that the said Letters Patent should be read with this correction therein that the same may conform to the record of the case in the Patent Office.

Signed and sealed this 5th day of January, A. D. 1943.

Henry Van Arsdale,
Acting Commissioner of Patents.

(Seal)